R. W. McCLELLAND.
Fifth Wheels for Vehicles.

No. 154,063. Patented Aug. 11, 1874.

Witnesses.

Inventor
R. W. McClelland.
by his Attys.

UNITED STATES PATENT OFFICE.

ROBERT W. McCLELLAND, OF CERRO GORDO, ILLINOIS.

IMPROVEMENT IN FIFTH-WHEELS FOR VEHICLES.

Specification forming part of Letters Patent No. 154,063, dated August 11, 1874; application filed April 30, 1874.

CASE B.

*To all whom it may concern:*

Be it known that I, ROBERT W. McCLELLAND, of Cerro Gordo, in the county of Piatt and State of Illinois, have invented a new and Improved Fifth-Wheel; and I do hereby declare the following to be a full and exact description of the same, reference being had to the accompanying drawings, forming part of this specification, in which—

Figure 1:
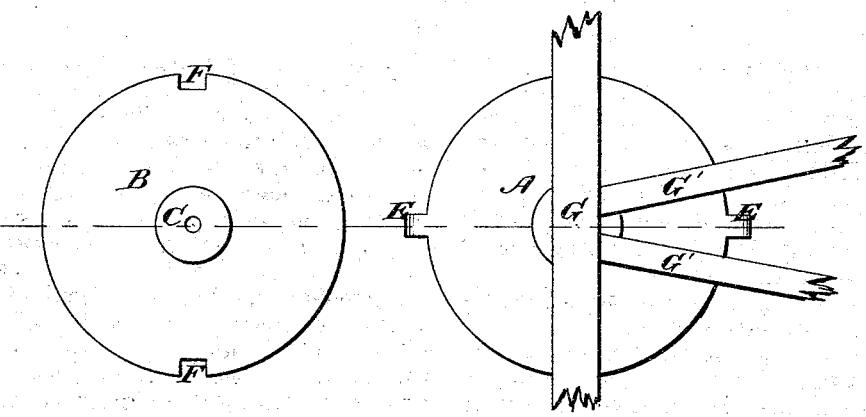
Figure 2:
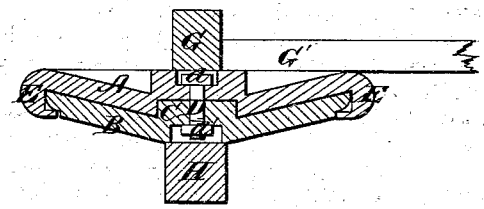

Figure 1 is a top-plan view of my invention, and Fig. 2 a transverse section.

Similar letters of reference in the accompanying drawings denote the same parts.

This invention has for its object to provide a strong and durable self-centering fifth-wheel, which shall be capable of retaining the oil used in lubricating until the same is entirely consumed, and which shall be adapted to be attached to the bolster and axle without the use of a king-bolt passing through the axle. To these ends my invention consists in the combination in a fifth-wheel of two plates, the upper having a convex or slightly conical lower surface, a circular recess in its center, and hooks or lugs on its periphery; the lower one having a concave or dished upper surface, a circular boss or projection in its center, adapted to fit into the recesses of the upper plate, and recesses in its periphery adapted to receive the hooks or lugs of the upper plate, the two plates being pivoted together by a suitable bolt, fitting together so that a dish-shaped crevice exists between them capable of retaining all the oil that can be introduced without allowing any to escape. The lower plate is provided at its center with a circular boss projecting upward into a corresponding recess in the upper plate, and the plates are pivoted together at the center by a bolt passing through both, and provided with a suitable head and nut, permitting the plates to turn independently of each other, but preventing their separation. The bolt is a substitute for the ordinary king-bolt, the plates being secured to the axle and bolster by other suitable means, all of which I will now proceed to describe.

In the drawings, A represents the upper, and B the lower plate, composing the fifth-wheel, said plates being circular and of equal diameters. The proximate faces of the plates A B are the reverse of each other, the plate A having a convex or slightly conical lower surface, while the lower plate has its upper surface hollowed to fit the lower surface of the upper plate closely, as shown. At the center of the lower plate B is a circular boss, C, projecting upward into a corresponding recess in the upper plate A. The plates A B are pivoted together by a bolt, D, passing through the center of each plate, and provided with a head, $d$, at its upper end, and with a nut, $d'$, at its lower end, said head and nut resting in recesses in the upper and lower surfaces of the plates, and preventing their separation. The plates are further secured by hooks or bent lugs E on the periphery of the upper plate, which project over the periphery of the lower plate, as shown, the latter being provided with recesses F for the admission of the hooks when the parts are first put together. It will be seen that a dish-shaped crevice exists between the plates A B, which is highest at the peripheries of the plates, and lowest at the center, and is therefore adapted to retain all the lubricant it can hold, the shoulder formed by the central boss C of the lower plate preventing its escape around the bolt D; consequently the oil remains between the plates until it is entirely consumed, none being allowed to escape. The central boss C of the lower plate projecting into the recess of the upper plate not only prevents the escape of oil at the center, but strengthens the connection of the plates and prevents their lateral displacement. The upper surface of the plate A and the lower surface of the plate B are adapted to be secured in any convenient manner to the bolsters G, reaches G', and axle H, the upper plate being provided with horizontal ribs or bearing-surfaces cast on its upper side, and corresponding to the positions of the bolster and reaches, the latter being secured to said ribs, which strengthen said upper plate. The plates being pivoted together, as before mentioned, obviates the necessity of a long king-bolt, and thus prevents the weakening of the axle, as the king-bolt usually passes through the latter.

It will be seen that the plates are held together not only by the bolt D, but by the hooks or lugs E, as they cannot be separated until the lower plate is turned so that its recesses F register with said lugs.

I claim as my invention—

The upper plate A, having a convex or slightly conical lower face, provided in the center with a circular recess, and having the lugs E, in combination with the lower plate B, having a concave upper face, provided with a circular projection, fitting the recess of the upper plate, and with recesses F, adapted to receive the lugs E, said plates being pivoted together by the bolt D, substantially as and for the purpose specified.

ROBT. W. McCLELLAND.

Witnesses:
   JONATHAN QUINN,
   ANDREW LESLEY.